United States Patent
Kleppe et al.

(10) Patent No.: US 10,649,188 B2
(45) Date of Patent: May 12, 2020

(54) HIGH-RESOLUTION SPECTRALLY SELECTIVE SCANNING MICROSCOPY OF A SAMPLE

(71) Applicant: Carl Zeiss Microscopy GmbH, Jena (DE)

(72) Inventors: Ingo Kleppe, Jena (DE); Ralf Wolleschensky, Jena (DE); Ralf Netz, Jena (DE); Yauheni Novikau, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 69 days.

(21) Appl. No.: 15/746,325

(22) PCT Filed: Jul. 19, 2016

(86) PCT No.: PCT/EP2016/066952
§ 371 (c)(1),
(2) Date: Jan. 19, 2018

(87) PCT Pub. No.: WO2017/013033
PCT Pub. Date: Jan. 26, 2017

(65) Prior Publication Data
US 2018/0196245 A1 Jul. 12, 2018

(30) Foreign Application Priority Data
Jul. 20, 2015 (DE) .................. 10 2015 111 702

(51) Int. Cl.
*G02B 21/06* (2006.01)
*G02B 21/00* (2006.01)
*G02B 27/58* (2006.01)

(52) U.S. Cl.
CPC ....... *G02B 21/0032* (2013.01); *G02B 21/006* (2013.01); *G02B 21/0024* (2013.01); *G02B 21/0076* (2013.01); *G02B 27/58* (2013.01)

(58) Field of Classification Search
CPC ............ G02B 21/0024; G02B 21/0032; G02B 21/006; G02B 21/0076; G02B 27/58; G02B 21/00; G02B 21/06; G01N 21/64
See application file for complete search history.

(56) References Cited

U.S. PATENT DOCUMENTS 5,043,570 A 8/1991 Takabayashi
5,329,352 A 7/1994 Jacobsen
(Continued)

FOREIGN PATENT DOCUMENTS

DE 41 11 903 A1 10/1992
DE 44 16 558 C2 9/1997
(Continued)

OTHER PUBLICATIONS

International Preliminary Report on Patentability and Written Opinion of the International Searching Authority dated Jan. 23, 2018.
(Continued)

*Primary Examiner* — William R Alexander
*Assistant Examiner* — Balram T Parbadia
(74) *Attorney, Agent, or Firm* — Duane Morris LLP

(57) ABSTRACT

In a high-resolution spectrally selective scanning microscopy of a sample, the sample is excited with illumination radiation in order to emit fluorescence radiation such that the illumination radiation is bundled into an illumination spot in or on the sample. The illumination spot is diffraction-limited in at least one spatial direction and has a minimum extension in said spatial direction. Fluorescence radiation emitted from the illumination spot is imaged into a diffraction image lying on an image plane in a diffraction-limited manner and is
(Continued)

detected with a spatial resolution which resolves a structure of a diffraction image of the fluorescence radiation emitted from the illumination spot. The illumination spot is moved into different scanning positions. An individual image is generated for each scanning position, in a diffraction-limited manner onto a detector. The local channels determine the spatial resolution with which the structure of the diffraction image of the fluorescence radiation emitted from the illumination spot is resolved, and the fluorescence radiation emitted from the illumination spot is spectrally evaluated.

16 Claims, 4 Drawing Sheets

(56) References Cited

U.S. PATENT DOCUMENTS

| | | | |
|---|---|---|---|
| 5,731,588 | A | 3/1998 | Hell et al. |
| 5,866,911 | A | 2/1999 | Baer |
| 5,867,604 | A | 2/1999 | Ben-Levy et al. |
| 6,633,432 | B2 | 10/2003 | Iketaki |
| 6,909,105 | B1 | 6/2005 | Heintzmann et al. |
| 2006/0017001 | A1* | 1/2006 | Donders ............ G02B 21/0036 250/390.07 |
| 2006/0044985 | A1 | 3/2006 | Hell |
| 2007/0133086 | A1 | 6/2007 | Wilhelm et al. |
| 2008/0068588 | A1 | 3/2008 | Hess et al. |
| 2009/0134342 | A1 | 5/2009 | Hell et al. |
| 2011/0267688 | A1 | 11/2011 | Kleppe et al. |
| 2012/0302892 | A1* | 11/2012 | Lue ...................... A61B 5/0071 600/476 |
| 2014/0029091 | A1 | 1/2014 | Kleppe et al. |
| 2014/0339438 | A1* | 11/2014 | Correns .................... G01J 3/28 250/459.1 |
| 2014/0340677 | A1* | 11/2014 | Sataka ................... G01N 21/64 356/318 |
| 2014/0361154 | A1 | 12/2014 | Hayashi |
| 2015/0008309 | A1 | 1/2015 | Wolleschensky et al. |
| 2015/0077842 | A1 | 3/2015 | Kleppe et al. |
| 2015/0077844 | A1* | 3/2015 | Singer ................ G02B 21/0032 359/385 |
| 2015/0085099 | A1 | 3/2015 | Kleppe et al. |
| 2016/0267658 | A1 | 9/2016 | Kleppe et al. |
| 2017/0227749 | A1 | 8/2017 | Kleppe et al. |

FOREIGN PATENT DOCUMENTS

| | | |
|---|---|---|
| DE | 103 25 460 A1 | 11/2004 |
| DE | 10 2006 021 317 B3 | 10/2007 |
| DE | 10 2013 019 348 A1 | 2/2015 |
| DE | 10 2013 015 933 A1 | 3/2015 |
| DE | 10 2013 017 124 A1 | 4/2015 |
| DE | 10 2014 111 167 A1 | 2/2016 |
| EP | 1 157 297 B1 | 11/2002 |
| EP | 1 795 938 A2 | 6/2007 |
| EP | 2 317 362 A1 | 5/2011 |
| WO | WO 2006/127692 A2 | 11/2006 |
| WO | WO 2013/135487 A1 | 9/2013 |

OTHER PUBLICATIONS

English Translation of International Preliminary Report on Patentability and Written Opinion of the International Searching Authority dated Jan. 23, 2018.
Hell, Stefan; "Far-Field Optical Nanoscopy"; Science 2007; 316:1153-1158.
https://en.wikipedia.org/wiki/Wiener-deconvolution.
International Search Report dated Sep. 15, 2016.

* cited by examiner

HIGH-RESOLUTION SPECTRALLY SELECTIVE SCANNING MICROSCOPY OF A SAMPLE

RELATED APPLICATIONS

The present application is a U.S. National Stage application of International PCT Application No. PCT/EP2016/066952 filed on Jul. 19, 2016 which claims priority benefit of German Application No. DE 10 2015 111 702.9 filed on Jul. 20, 2015, the contents of each are incorporated by reference in their entirety.

FIELD OF THE INVENTION

The invention relates to a method for high-resolution spectrally selective scanning microscopy of a sample. The sample is excited from illumination radiation to emit fluorescent radiation such that the illumination radiation is focused into an illumination spot in or on the sample. The illumination spot is diffraction-limited in at least one spatial direction and has in this spatial direction a minimum extent and is in particular in the shape of a point or line. Fluorescent radiation coming from the illumination spot is imaged, in a diffraction-limited manner, into a diffraction image located in an image plane and captured with a spatial resolution that resolves a structure of a diffraction image of the fluorescent radiation coming from the illumination spot, the illumination spot is displaced relative to the sample into different scanning positions at an increment size of less than half the minimum extent of the illumination spot. For each scanning position an individual image of the structure of the diffraction image of the fluorescent radiation coming from the illumination spot is produced and an image of the sample is produced from the individual images, which image has a resolution that is increased over a resolution limit of the imaged image. The fluorescent radiation coming from the illumination spot is imaged, in a diffraction-limited manner, into a diffraction image on a detector which has, in the image plane, an entrance surface having a plurality of location channels which are disposed next to one another and determine the spatial resolution with which the structure of the diffraction image of the fluorescent radiation coming from the illumination spot is resolved, and the fluorescent radiation coming from the illumination spot is spectrally evaluated.

The invention further relates to a microscope for high-resolution spectrally selective scanning microscopy. A sample space is provided for receiving a sample which is excitable to emit fluorescent radiation. An optical unit is also provided which has a focal plane, located in the sample space, and a resolution limit. Also provided is an illumination device, which has an entrance for supplying illumination radiation and illuminates, via the optical unit the sample space with the illumination radiation such that the optical unit focuses the illumination radiation at a point in the focal plane to form an illumination spot. The illumination spot is diffraction-limited in at least one spatial direction and has, in this spatial direction, a minimum extent. An imaging device is arranged for diffraction-limited imaging of fluorescent radiation coining from the illumination spot in the focal plane through the optical unit into a diffraction image on a spatially resolving surface detector which is located in an image plane that is conjugate to the focal plane. The surface detector has a plurality of location channels which are disposed next to one another and determine a spatial resolution with which the structure of the diffraction image of the fluorescent radiation coming from the illumination spot is resolved, wherein the spatial resolution resolves a structure of the diffraction image. A scanning device for displacing the point into different scanning positions at an increment size of less than half the minimum extent of the illumination spot is also provided. An evaluation device is arranged for reading the surface detector, for evaluating the diffraction structure of the diffraction image from individual image data of the surface detector and from the scanning position is assigned to said individual image data, and for producing an image of the sample that has a resolution that is increased to above the resolution limit.

One classical area of application of light microscopy for examining biological samples is luminescence microscopy. Here, specific dyes (known as phosphors or fluorophores) are used to specifically label samples, e.g. cell parts. The sample is illuminated with illumination radiation being excitation radiation, and the luminescence radiation that has been excited thereby is captured using suitable detectors. In this way, imaging of individual, differently colored cell parts in the microscope is possible. It is of course also possible for a plurality of parts of a sample to be colored at the same time with different dyes which bind specifically to different structures of the preparation. This method is referred to as multiluminescence. It is also possible to measure samples that luminesce per se, i.e. without the addition of dyes.

As is generally the case, luminescence is here understood to be the generic term for phosphorescence and fluorescence, i.e. it covers both processes. Where fluorescence is mentioned, this is intended to be understood pars pro toto and not a limitation.

For examining samples, it is also known to use laser scanning microscopes (also LSM for short) which use a confocal detection arrangement (in that case known as confocal LSM) or a non-linear sample interaction (known as multiphoton microscopy) to image only the plane that is located in the focal plane of the objective. An optical section is obtained, and capturing a plurality of optical sections at different depths of the sample permits the generation of a three-dimensional image of the sample, which is made up of the different optical sections. Laser scanning microscopy is therefore suitable for examining thick samples. A combination of luminescence microscopy and laser scanning microscopy is, of course, also used, in which a luminescent sample is imaged in different depth planes using an LSM.

In principle, the optical resolution of a light microscope, including that of an LSM, is diffraction-limited by physical laws. The term "high-resolution" is here used for resolutions beyond the diffraction limit.

U.S. Pat. No. 5,043,570 describes an attempt to increase the resolution by way of "oversampling." This does not result in a significantly increased resolution beyond the diffraction limit of the microscope.

Using nonlinear depopulation processes, the resolution can be raised to a factor of up to 10 with respect to a diffraction-limited confocal LSM. Such a method is described, for example, in U.S. Pat. No. 5,866,911. For depopulation processes, different approaches are known, for example those described in DE 4416558 C2, U.S. Pat. No. 6,633,432, or DE 10325460 A1.

Another high-resolution microscopy method is mentioned in U.S. Pat. No. 5,867,604, in which an object is sampled with a periodic structure. A similar method for increasing resolution is mentioned in EP 1157297 B1. Structured illumination uses nonlinear processes, e.g. saturation of the fluorescence. The approach requires a reconstruction algorithm for image generation and the use of a plurality of frames for an image.

A method that achieves high resolution in the wide field is known from WO 2006127692 and DE 102006021317. This method, shortened to PALM (photo-activated light microscopy) uses a labeling substance that can be activated from an optical activation signal. The labeling substance can be excited by excitation radiation to emit specific fluorescent radiation only when in the activated state. The activation is effected such that at least a specific portion of the activated labeling molecules are arranged at such a distance from neighboring activated molecules that they are separated, or can be separated retrospectively, in terms of the optical resolution of the microscope. After capturing of the luminescent radiation from said isolated molecules, the center of their diffraction-limited radiation distribution is determined and, on that basis, the position of the molecules is determined by way of calculation with greater accuracy than would actually be possible with optical imaging. To image the entire sample, the isolation of the labeling molecules of the subset by introducing the activation radiation, subsequent excitation and fluorescent radiation imaging is repeated until all labeling molecules, where possible, have been included once in a subset and have been isolated.

Further high-resolution methods are described in Hell, "Far-Field Optical Nanoscopy," Science 316, 1153-1158, 2007.

Another high-resolution method and microscope is known from EP 2317362 A1. This document combines, in the embodiment illustrated in FIG. 5 therein, diffraction-limited illumination of the sample with a detector, wherein a scanning device is configured such that the diffraction image of the point that is illuminated by the illumination spot rests on the detector. This arrangement is referred to as a "de-scanned" detector arrangement. It is typically achieved in that a scanner that deflects the beam path is arranged between the sample and the superposition point of illumination device and imaging device. In that case such scanner acts both on the illumination spot and on the diffraction-limited imaging of the point that is illuminated by the illumination spot, with the result that the beam path in the imaging direction is static after the scanner. An alternative of such a scanner is the use of a movable sample stage which displaces the sample. In that case, the diffraction image also rests on the detector. In the concept of EP 2317362 A1, the detector is provided with a spatial resolution that, with reference to the imaging scale, effects oversampling of the diffraction image and thus permits to detect of the diffraction structure of the diffraction image. The method is referred to as Airyscan microscopy.

EP 2317362 A1 provides an embodiment of Airyscan microscopy, in which color analysis is possible. A plurality of detectors are provided herefor, which are located in corresponding spectral channels that are generated by a dichroic color splitter. This approach has long been known for laser scanning microscopy. However, it has the disadvantage that a suitable color splitter having an individual detector is required for each color channel. In conventional laser scanning microscopy, which uses a non-spatially resolving detector behind a confocal pinhole, this requirement is largely unproblematic; but using an oversampling detector in accordance with EP 2317362 A1 is associated with a considerable outlay, especially since such service detectors are expensive. In addition, in the oversampling principle in accordance with EP 2317362 A1, these multiple detectors would need to be adjusted with subpixel accuracy with respect to one another, since otherwise a chromatic aberration between the produced images of the individual color channels would occur, which is caused by the data of the detectors being shifted to the scanning position, which for high-resolution images is shifted in increments that are small with respect to the diameter of the illumination spot. The images of the individual color channels fit over one another only if the detectors are adjusted with subpixel accuracy in all color channels with respect to the optical axis, WO 2013/135487 A1 addresses the problem relating to the ability to use simpler detectors for the detector device in Airyscan microscopy. To this end, a redistribution element, for example a fiber bundle, is provided which picks up the diffraction image in the image plane and redistributes it to a detector, the geometric pixel arrangement of which can be entirely different.

DE 102013019348 A1 uses two such fiber bundles to obtain color information. Both fiber bundles lead to a common detector, and the radiation supplied to them is spectrally filtered in different ways. Here, the problem arises that either a detector that is twice the size is needed, which in turn causes structural outlay and expense, or only half the spatial resolution of the surface detector is available to the detriment of spectral resolution.

DESCRIPTION OF THE INVENTION

The invention is therefore based on the object of developing a method and a microscope of the type mentioned in the introductory part in a way such that, when producing the color information, no additional adjusting outlay or outlay for multiple detectors arises and the spatial resolution is nevertheless not reduced in a disturbing manner.

This object is achieved according to the invention by way of a method for high-resolution spectrally selective scanning microscopy of a sample, wherein the sample is excited from illumination radiation to emit fluorescent radiation such that the illumination radiation is focused into an illumination spot in or on the sample, wherein the illumination spot is diffraction-limited in at least one spatial direction and has in this spatial direction a minimum extent and is in particular in the shape of a point or line, fluorescent radiation coming from the illumination spot is imaged, in a diffraction-limited manner, into a diffraction image located in an image plane and captured with a spatial resolution that resolves a structure of a diffraction image of the fluorescent radiation coming from the illumination spot, the illumination spot is displaced relative to the sample into different scanning positions at an increment size of less than half the minimum extent of the illumination spot, for each scanning position an individual image of the structure of the diffraction image of the fluorescent radiation coming from the illumination spot is produced and an image of the sample is produced from the individual images, which image has a resolution that is increased over a resolution limit of the imaged image, wherein the fluorescent radiation coming from the illumination spot is imaged, in a diffraction-limited manner, into a diffraction image on a detector which has, in the image plane, an entrance surface having a plurality of location channels which are disposed next to one another and determine the spatial resolution with which the structure of the diffraction image of the fluorescent radiation coming from the illumination spot is resolved, and wherein the fluorescent radiation coming from the illumination spot is spectrally evaluated, wherein the fluorescent radiation is guided to a spectrometer in exactly one first of the location channels, which are disposed next to one another, and spectrally evaluated thereby, and in the remaining second ones of the location channels, which are disposed next to one another, the fluorescent radiation is guided in each case onto a detector element which does not perform spectral evaluation and captures the fluorescent radiation only with respect to the intensity.

The object is further achieved in accordance with the invention by way of a microscope for high-resolution spectrally selective scanning microscopy, comprising a sample space for receiving a sample which is excitable to emit fluorescent radiation, an optical unit which has a focal plane, located in the sample space, and a resolution limit, an illumination device, which has an entrance for supplying illumination radiation and illuminates, via the optical unit the sample space with the illumination radiation such that the optical unit focuses the illumination radiation at a point in the focal plane to form an illumination spot, which is diffraction-limited in at least one spatial direction and has, in this spatial direction, a minimum extent, an imaging device for diffraction-limited imaging of fluorescent radiation coming from the illumination spot in the focal plane through the optical unit into a diffraction image on a spatially resolving surface detector which is located in an image plane that is conjugate to the focal plane, wherein the surface detector has a plurality of location channels which are disposed next to one another and determine a spatial resolution with which the structure of the diffraction image of the fluorescent radiation coming from the illumination spot is resolved, wherein the spatial resolution resolves a structure of the diffraction image, a scanning device for displacing the point into different scanning positions at an increment size of less than half the minimum extent of the illumination spot, an evaluation device for reading the surface detector, for evaluating the diffraction structure of the diffraction image from individual image data of the surface detector and from the scanning position is assigned to said individual image data, and for producing an image of the sample that has a resolution that is increased to above the resolution limit, wherein exactly one first of the location channels, which are disposed next to one another, guides the fluorescent radiation onto a spectrometer, which spectrally evaluates it, and the remaining second ones of the location channels, which are disposed next to one another, guide the fluorescent radiation in each case onto a detector element, which does not perform spectral evaluation and captures the fluorescent radiation only with respect to the intensity.

The invention a substantially maintains resolution of Airyscan microscopy and, at the same time, achieves spectral image information by guiding one of the location channels to a spectrometer, i.e. the radiation guided therein is spectrally analyzed. Obtained from this spectral analysis is color data or color information that supplements the location information obtained from the remaining location channels in a manner known from Airyscan microscopy.

The spectral information thus originates from a location channel whose quantity of light corresponds to that of a pinhole that is so small that it receives only part of the Airy diffraction disk. The spectrometer can thus be a spectrometer as is known from laser scanning microscopy (for example a spectrometer having freely combinable digital channels).

The first location channel in which the fluorescent radiation is spectrally analyzed has the function of a color channel. The color information obtained from this color channel can be combined in different ways with the location information obtained from the remaining, second location channels. In a process with particularly low outlay in terms of calculation, a high-resolution image of the sample is obtained from the second location channels. At this point in time, this is purely a grayscale image, since the second location channels provide no color information. This grayscale image can be supplemented with the color information from the first location channel to form a color image. Here, each point of the high-resolution image is assigned the color information that was obtained for the corresponding scan position from the first location channel, i.e. the color channel. In this way, it is possible to quickly obtain a high-resolution color image of the sample while maintaining existing algorithms for producing the image from the individual images. A disadvantage here is that, when producing the high-resolution image from the individual images, no spectral information is available in the algorithm. The algorithm in that case works with a point spread function that corresponds to an average (a "gray," as it were) point spread function over the expected spectral range of the fluorescent radiation.

If the intention is to remedy this disadvantage and to establish a spatial resolution in the image that is increased further, then preference is given in one alternative to assigning, for each individual image, the color information obtained for the corresponding individual image from the first location channel to the intensity information from the second location channels. In that case, the algorithm for image reconstruction from the individual images can utilize this color information, for example calculate with the spectrally corresponding ("colored," as it were) point spread function. In a trade-off with increased calculation complexity, an even more accurate image reconstruction with even higher resolution is obtained.

The separation of the first location channel from the second location channels can be effected in a particularly simple structural manner by way of guiding one or more optical fibers of a fiber bundle, which acts as a redistribution element, to a spectrometer. The number of fiber bundles that form the first location channel determines the quantity of light the spectrometer receives.

A greater number of optical fibers increases the surface proportion of the first location channel in the entrance surface at which the diffraction images recorded. As a result, the quantity of light in the spectrometer, and ultimately the spectral resolution, increases. However, the spatial resolution can decrease since fewer image points are available for capturing the diffraction structure. This diffraction structure is determined, as mentioned above, from the second location channels. Fewer optical fibers reduce the spectral resolution, possibly owing to a decreased signal-to-noise ratio, and provide increased spatial resolution of the diffraction image. It is here also possible to spectrally resolve a plurality of fibers individually (and thus in comparatively fewer channels), which has the advantage that it becomes possible to swap spectral resolution for spatial resolution and to effect calculation more easily.

In one combination, the radiation intensity from the first location channel can be added on after obtaining the color information via the color channels, such that the first location channel acts not only as a color channel but also provides a signal that corresponds to a second location channel which does not effect spectral evaluation. In this way, the spatial resolution during generation of the high-resolution image is not or less reduced.

In order to obtain color information that is particularly true, it is preferred to provide in the entrance surface of the surface detector device for the first location channel a hole through which the fluorescent radiation falls and is guided to the spectrometer as a free beam. Spectral influences of an optical fiber are then not present. The remaining location channels can be guided to the non-spectrally resolved detector elements either using a corresponding mirror system or using optical fibers. In addition, calculation can be carried out in a common system of equations, in which the location channels contribute as a sum over different colors and the color channels have only one entry in the color.

In a different embodiment, the location channels are demixed for calculation via the PSF and the demixing is optimized with a variable PSF until the results are compatible in terms of the color separation with the measurements from the color channels.

In a further option, located in the entrance surface of the surface detector device is a DMD element that reflects the radiation for the first location channel to the spectrometer and the radiation for the second location channels to the entrance side of an optical fiber bundle or to a 2D detector array.

The term "diffraction-limited" is here not intended to be limited to the diffraction limit in accordance with Abbe's theory, but also to encompass cases in which the theoretical maximum is missed by 20% for reasons of real shortfalls or limitations. Even here the individual image has a structure that is referred herein to as diffraction structure which is oversampled.

Imaging of a desired region of the sample is effected in a scanning manner, as in a typical LSM. Since illumination and imaging or the corresponding devices have a common optical scanning device that guides the illumination spot over the sample and at the same time descans, with respect to the detection, the point which coincides with the illumination spot and in which the sample is imaged, it is possible for a zoom optical unit to be placed in the common part of illumination and imaging device. Said unit permits to effect adaptation of the diffraction image to the size of the entrance surface of the detector device and additionally to couple the available illumination radiation, without margin losses, completely into the objective pupil, which can vary with the selection of the objective.

The illumination spot is diffraction-limited in at least one spatial direction. Instead of the already mentioned point or line shape, it is also possible to use the shape of a donut or a helix for the point spread function (PSF).

Where a method is described here, a control device implements these method steps during operation of the microscope.

It goes without saying that the aforementioned features and those yet to be explained below can be used not only in the combination specified in each case but also in other combinations or on their own, without departing from the spirit and scope of the present invention.

BRIEF DESCRIPTION OF THE DRAWINGS

The invention is explained in more detail below for example on the basis of the accompanying drawings, which also disclose features essential to the invention. In the figures.

DETAILED DESCRIPTION OF THE DRAWINGS

Figure 1:
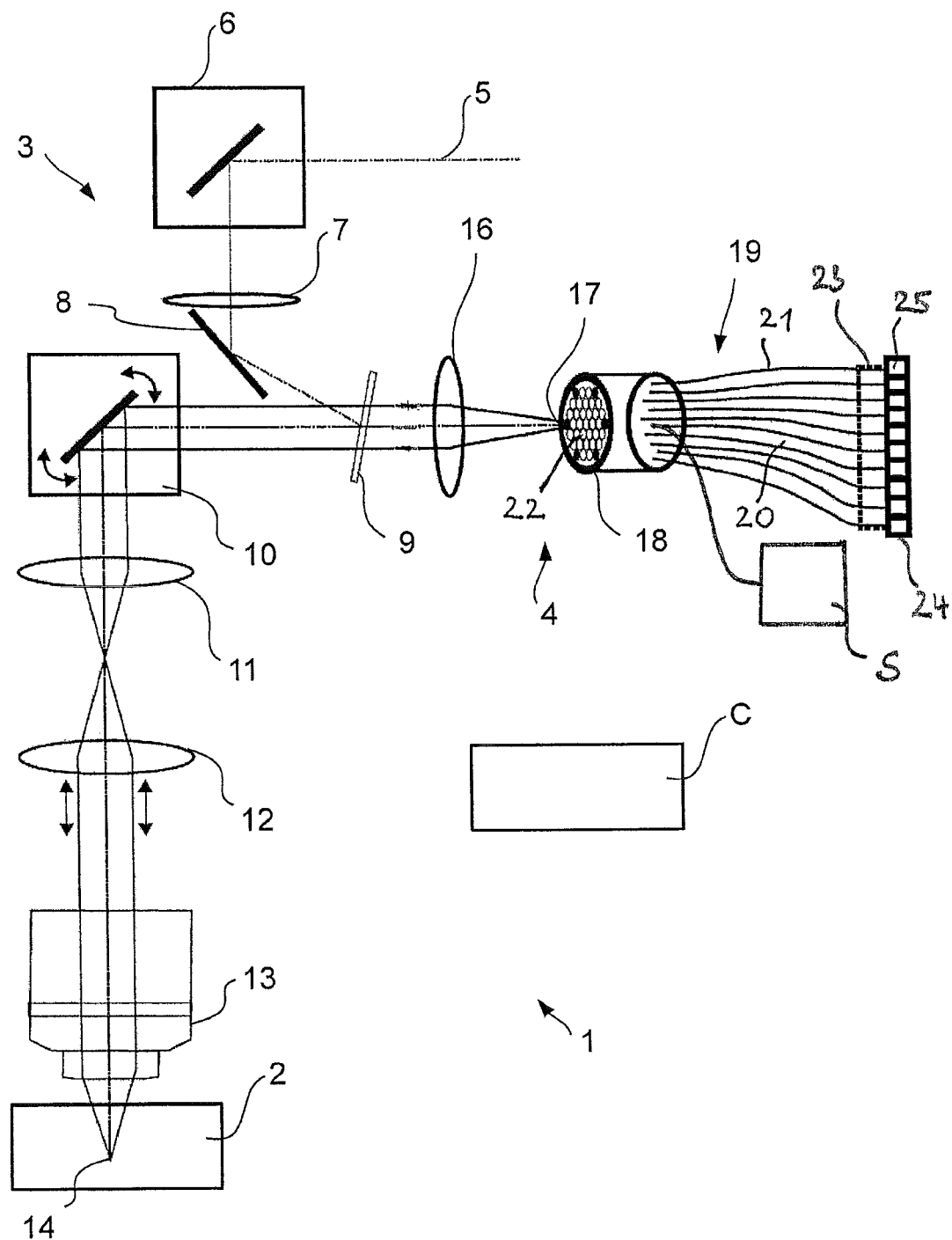
FIG. 1 shows a schematic illustration of a laser scanning microscope for high-resolution Airyscan microscopy.

FIG. 1 schematically illustrates a laser scanning microscope 1 configured for microscopic examination of a sample 2. The laser scanning microscope (referred to below as LSM) 1 is controlled by a control device C and comprises an illumination beam path 3 and an imaging beam path 4. The illumination beam path illuminates a spot in the sample 2, and the imaging beam path 4 images said spot in a diffraction-limited manner for detection. Illumination beam path 3 and imaging beam path 4 share an optical unit.

The sample 2 is illuminated in the LSM 1 using a provided laser beam 5 which is coupled to a mirror 8 via a deflection mirror 6, which is otherwise not functionally necessary, and a lens 7. The mirror 8 ensures that the laser beam 5 is incident on an input coupling element at a reflection angle. The input coupling element can simultaneously be an emission filter. For clarity, only the principal axis of the laser beam 5 is drawn.

After the laser beam 5 was reflected at the input coupling element 9, the beam it is biaxially deflected by a scanner 10 and focused by lenses 11 and 12 and through an objective 13 to a diffraction-limited illumination spot 14 in a focal plane 29. In the illustration of FIG. 1 the illumination spot 14 has the shape of a point; however, an illumination spot in the form of a line is also possible. Fluorescence radiation that was excited at the location (e.g. point) of the illumination spot 14 is guided out of the focal plane 29 back to the scanner 10 via the objective 13 and the lenses 11 and 12. After the scanner the light beam is static in the imaging direction. The beam passes through the input coupling element 9, which here additionally has the function of selecting the fluorescence radiation from the illumination spot 14 with respect to the wavelength range and to block the illumination radiation of the laser beam 5 that can serve, for example, as excitation radiation. A lens 16 ensures that overall, the location of the illumination spot 14 is imaged in a diffraction-limited diffraction image 17, which is located to a detection plane or image plane 18. The image plane 18 is a plane conjugate to the focal plane 29, in which the illumination spot 14 in the sample 2 is located.

The diffraction image 17 of the illumination spot 14 is detected in the detection plane by a surface detector device 19, the exemplary configuration of which will be discussed in more detail below with reference to FIG. 2. What is essential here is that the detector device 19 spatially resolves the diffraction-limited image 17 of the spot 14 in the image plane 18, i.e. effects oversampling.

The control device C controls all components of the LSM 1, in particular scanner 10 and detector device 19. The control device C acquires for different scan positions the data of each individual image 17, analyzes the diffraction structure thereof and produces a high-resolution total image of the sample 2.

The LSM 1 in FIG. 1 is illustrated by way of example for a single and point-shaped illumination spot 14, which is sampled on the sample. However, it can also be used for sampling in accordance with a line illumination spot which extends, for example, perpendicularly to the drawing plane of FIG. 1. It is also possible for the LSM 1 in FIG. 1 to be configured such that a plurality of point illumination spots that are disposed next to one another are sampled in the sample. Their corresponding diffraction images 17 are in that case likewise disposed next to one another in the image plane 18. The surface detector device 19 is then correspondingly configured to detect the diffraction images 17 that are disposed next to one another in the detection plane.

The detector device 19 records the radiation at a plurality of location channels in the image plane, which is thus a detection plane 18. One or more of said location channels guide/guides the radiation, as will be discussed below, onto a spectrometer S.

Figure 2:
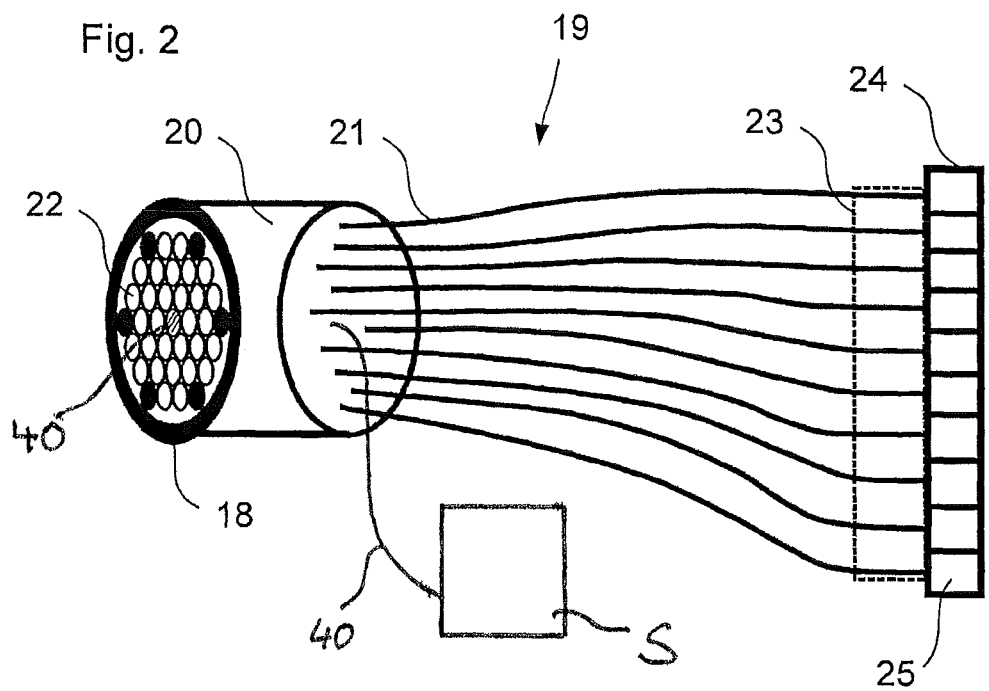
FIG. 2 shows an enlarged illustration of a surface detector device used in the microscope in FIG. 1, FIGS. 3 and 4 show plan views of an optical fiber bundle that can be used in the surface detector device in FIG. 2.

One exemplary embodiment of the detector device 19 is illustrated in enlarged fashion in FIG. 2. It comprises an optical fiber bundle 20, which feeds an e.g. linear detector array 24. The optical fiber bundle 20 is made up of individual optical fibers 21. The ends of the optical fibers 21 form the optical fiber bundle entrance 22, which is located in the detection plane 18. The individual optical fibers 21 thus form location channels in which the diffraction image 17 of the illumination spot 14 is detected. They functionally correspond to pixels of a matrix detector placed in the detection plane 18.

Since the illumination spot 14 in the embodiment of FIG. 1 is, by way of example, a point spot, the diffraction image 17 is an Airy disk, the extent of which lies within the circle that illustrates the image plane in FIGS. 1 and 2. It should be pointed out that FIG. 1 contains a simplification in this respect. In reality the extent of the optical fiber bundle entrance 22 is so great that it covers the extent of the diffraction image.

However, one of the location channels guides the radiation not to the detector array 24, but to a spectrometer S, which spectrally analyses the received radiation, for example in a plurality of digitally combinable spectral channels. Said location channel has the function of a color channel and was referred to in the general part of the description as a "first location channel." The remaining optical fibers 21 in the optical fiber bundle 20, on the other hand, are guided to the detector array 24, which is not spectrally resolving. They are thus referred to as pure location channels and in the general part of the description as "second location channels."

In a refinement, which is shown in the figures but is optional, the optical fibers of the second location channels in the optical fiber bundle 20 are brought into a different geometric arrangement at their exits than at the optical fiber bundle entrance 22, e.g. in the form of an elongate plug 23, in which the exit ends of the optical fibers of the second location channels are disposed next to one another. The plug 23 is formed so as to match the geometric arrangement of the detector line that forms the detector array 24, i.e. each exit end of an optical fiber 21 is located exactly in front of a pixel 25 of the detector line 24.

It should be noted that the second location channel configuration of the detector device 19 of FIG. 2 is purely by way of example.

Figure 3:
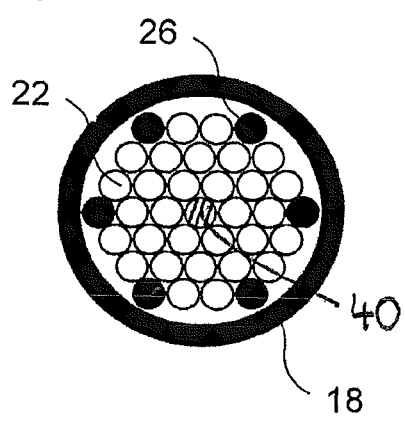
Figure 4:
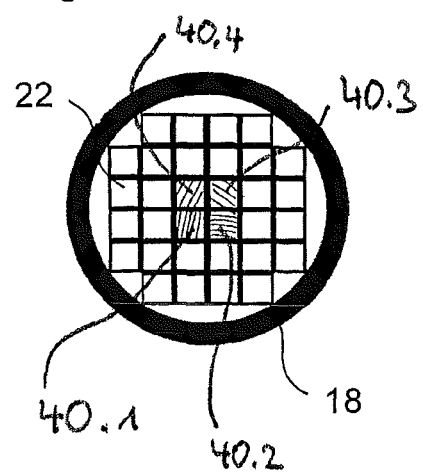

FIGS. 3 and 4 show possible embodiments of the optical fiber bundle entrance 22. The optical fibers 21 can be fused at the optical fiber bundle entrance 22. The result is a greater fill factor, i.e. gaps between the individual optical fibers 21 at the optical fiber bundle entrance 22 are minimized. On the other hand, fusing results in some crosstalk between neighboring optical fibers. If this is to be avoided, the optical fibers can be adhesively bonded together. A square arrangement of the ends of the optical fibers 21 is also possible, as FIG. 4 shows.

The individual optical fibres 21 are preferably assigned to the individual pixels 25 in the detector array 24 such that optical fibres 21, which are disposed next to one another at the optical fibre bundle entrance 22, are also disposed next to one another at the detector array 24. This approach minimizes crosstalk between neighboring pixels 25, which can occur for example due to scatter radiation or in signal processing of the individual pixels 25. If the detector array 24 is a line, the corresponding arrangement can be achieved by specifying the order of the individual optical fibers on the detector line by a spiral which, in plan view of the detection plane 18, connects the individual optical fibers one after the other.

FIG. 3 also shows optional dummy fibres 26, which are located at the optical fiber bundle entrance 22 in the corners of the arrangement of the optical fibers 21. Said dummy fibers are not guided to pixels 25 of the detector array 24. At the locations of the dummy fibers, no signal intensity required for evaluating the signals would be present anymore. As a result, the number of optical fibers 21 and therefore the number of the pixels 25 in the detector array 24 can be reduced such that, for example, one can work with e.g. 32 pixels. Such detector lines are already used otherwise in laser scanning microscopes, which has the advantage that in such laser scanning microscopes signal evaluation electronics need to be provided only once, and one only needs to switch from an already existing detector line 24 to the further detector line 24 added for the detector device 19.

In the embodiment in accordance with FIG. 4, optical fibers having a square basic shape are used for the bundle. They likewise have a high degree of coverage in the detection plane 19, i.e. efficiently collect the radiation.

FIGS. 2, 3 and 4 show that an additionally optical fibre 40 leading to the spectrometer S starts at the optical fiber bundle entrance 22. This entrance surface of the optical fiber 40, which is hatched in the figures, forms the start of the first location channel.

By way of example, FIG. 4 shows four optical fibers for the first location channel, specifically optical fibers 40.1, 40.2, 40.3 and 40.4. This is intended to illustrate by way of example that it is also possible for more optical fibers, or for an optical fiber having a greater cross section, to lead to the spectrometer S but not to a single pixel 25 of the detector array 24.

Figure 5:
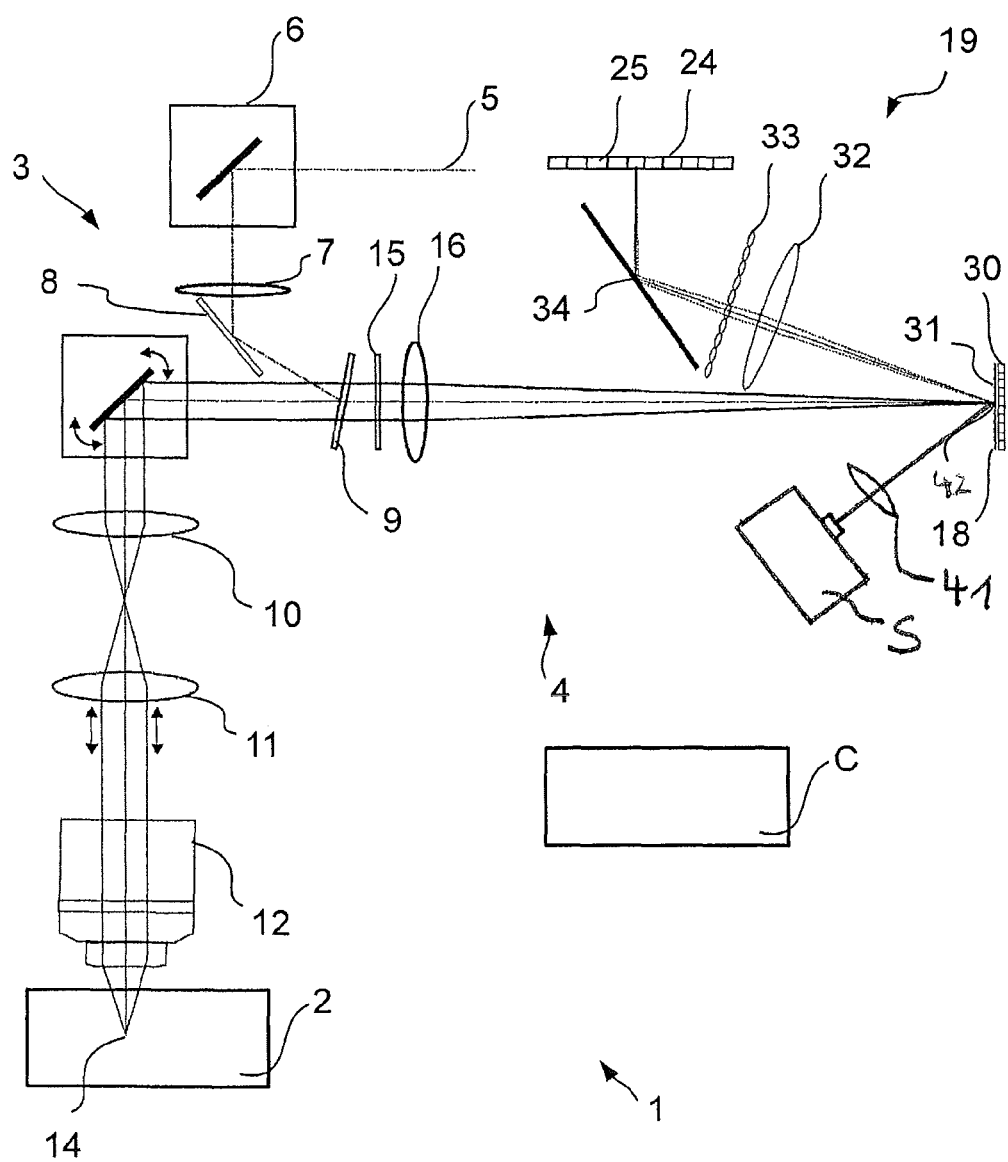
FIG. 5 shows a modification of the microscope in FIG. 1, with the modification concerning the surface detector device.

FIG. 5 shows a modification of the LSM 1 in FIG. 1 with respect to the detector device 19. Said detector device 19 has a facet mirror 30 bearing individual facets 31. Said facets 31 correspond to the ends of the optical fibers 21 at the optical fiber bundle entrance 22 with respect to the resolution of the image 17. The individual facets 31 differ in terms of their inclination with respect to the optical axis of the radiation incidence. Together with the lens 32 and a mini lens array 33 and with a deflection mirror 34, which serves only for beam folding, each facet 31 images a surface section of the individual image 17 on to a pixel 25 of the detector array 24. Depending on the orientation of the facets 31, the detector array 24 can here be preferably a 2D array, but a detector line is also possible.

The facet mirror 30 is here configured such that a single (or a plurality of) facet(s) 42 guide/guides the radiation for the first location channel into a different direction than for the remaining, second location channels. The radiation of the first location channel is then guided, via a lens 41, to the spectrometer S, for example the entrance gap thereof. The remaining location channels are not captured for spectral evaluation.

In one further development the facet mirror 30 can be a DMD. This permits switching between color evaluating and non-spectrally evaluating operation, depending on whether the mirror 42 guides the radiation of the first location channel to the spectrometer S or to the detector array 24.

Figure 6:
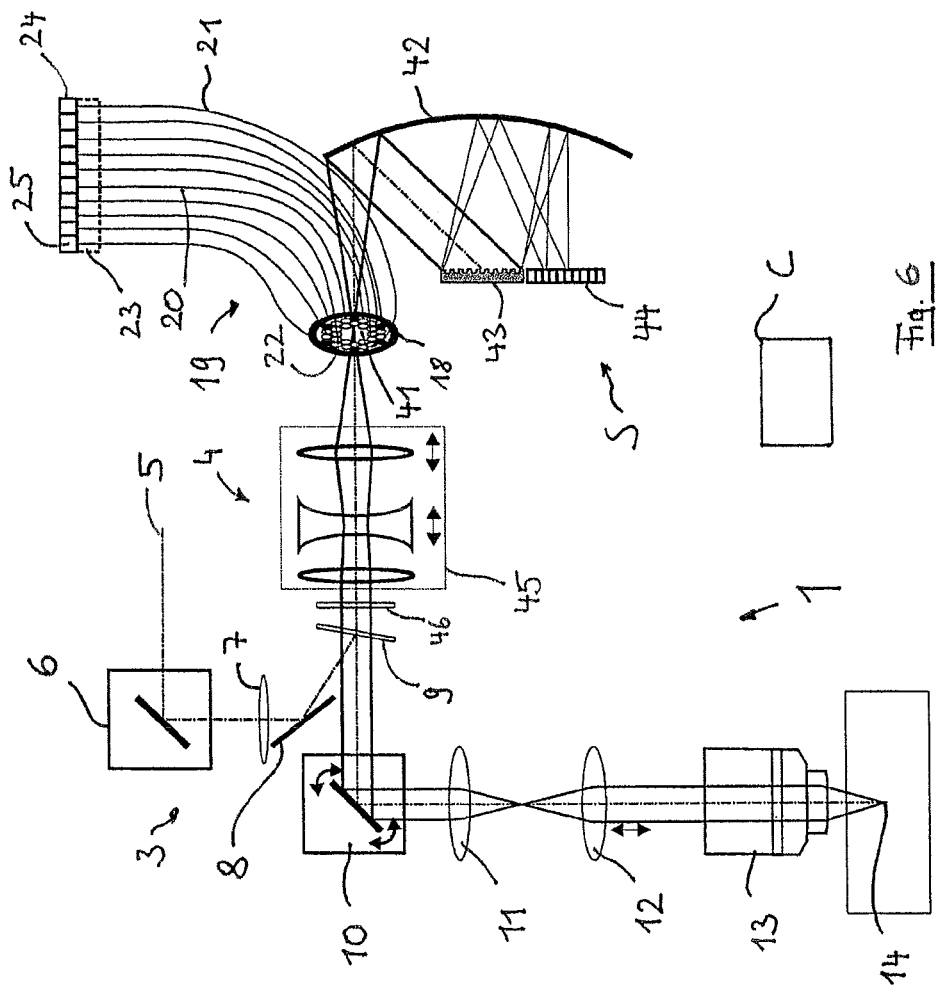
FIG. 6 shows a schematic illustration of a laser scanning microscope similar to that of FIG. 1, but using a modified detector device.

In a modified configuration, shown in FIG. 6, the optical fiber bundle 20 has, at its entrance side, i.e. in the detection plane 19, a hole 41 rather than the optical fiber 40. The radiation that falls through said hole 41 is then guided in a free optical path to the spectrometer S. The spectrometer S has, in the embodiment in FIG. 6, by way of example, a converging mirror 42, a grating 43 and a detector line 44. The mirror 42 guides radiation, which has fallen through the hole 41, onto the grating 43, which effects spectral separation. The spectrally spread radiation is then detected by the detector line 44. This construction has the advantage that the surface can be distributed between the first location channel and the second location channel with little constructive effort, specifically by appropriately selecting the size of the hole 41 which is surrounded by the ends of the optical fibers 21 that form the second location channels. An adjustable optical focusing unit, illustrated by way of example in FIG. 6, allows the distribution during operation. The unit adjust the position of the detection plane 18 with respect to the optical fiber bundle entrance 22.

FIG. 6 likewise shows by way of example that an additional emission filter 46 can be arranged downstream of the input coupling element 9 in the imaging direction in the detection beam path 4. Said emission filter 46 complements or replaces an emission-filtering effect of the input coupling element 9. The additional or alternative emission filter and the settable focusing optical unit are, of course, also possible in designs according to FIGS. 1 and 5.

The evaluation of the color information can be done in different embodiments of the method as was explained in the general part of the description. With respect to the generation of the high-resolution image from the individual images, reference is made, for example, to EP 2317362 A2, the disclosure of which is here incorporated in its entirety. If this principle is followed, and if one uses the second-mentioned variant in the general part of the description, in which each pixel of the location channel is assigned a color information in each individual image, the following should be noted for the equation approach described in EP 2317362 A1 mentioned in the introduction:

For a better explanation of the mathematical analysis of setting up the system of equations, initially the case that only one color occurs, i.e. the spectral-selective element 15 is omitted, is considered. If O(r) designates the object, E(r) designates the point spread function (PSF) of the excitation, and H(r) designates the PSF of the detection, for each image point the following equation is obtained as the signal D(r,P), wherein r designates the distance from the location p of the illumination spot:

$$D(r, p) = \int_r O(p - r')E(r')H(r' + r)dr' \quad (1)$$

A Fourier transform of D(r,P) with respect to the location p gives:

$$D(r,\omega) = O(\omega) FT_{r'}\{E(r')H(r'+r)\} \quad (2)$$

This product of real space becomes the following convolution in Fourier space:

$$D(r, \omega) = O(\omega) \int_\omega E(\omega')H(\omega - \omega')e^{i(\omega - \omega')r} d\omega' \quad (3)$$

If a support function is introduced at the location r:

$$EH(r,\omega)) = FT_{r'}\{E(r')H(r'+r)\} \quad (4)$$

equation (2), takes the form $$D(r,\omega)) = O(\omega))EH(r,\omega)) \quad (5)$$

Different locations r on the detector are combined using a Wiener filter $$\tilde{O}(\omega) = \frac{\sum_r D(r, \omega)EH^*(r, \omega)}{\langle|n(\omega)|^2\rangle / \langle|O(\omega)|^2\rangle + \sum_r |EH(r, \omega)|^2}, \quad (6)$$

wherein $\langle|O(\omega)|^2\rangle$ and $\langle|n(\omega)|^2\rangle$ are the corresponding spectral power densities of the signal ("O") and of the noise (n).

With this in mind, then for a plurality of color channels, which are assigned to each pixel of the second location channels, the weightings specified by the PSF are obtained as follows:

$$D(r, \omega) = \sum_c O_c(\omega)EH_c(r, \omega) \quad (7)$$

In this equation, c is the color channel index. If the equation (7) is written as a matrix, then:

$$[D(r,\omega)]_r = [O_c(\omega)]_c[EH_c(r,\omega)]_{c,r} \quad (8)$$

If additional noise is in taken into consideration, equation (8) takes the following form:

$$[\tilde{D}(r,\omega)]_r = [O_c(\omega)]_c[EH_c(r,\omega)]_{c,r} + [N(r,\omega)]_r \quad (9)$$

The object $[O_c(\omega)]_c$ can be obtained using an operator $[G_c(r,\omega)]_{r,c}$ which combines frequency filtering and color channel demixing:

$$[O_c(\omega)]_c = [G_c(r,\omega)]_{r,c}[\tilde{D}(r,\omega)]_r. \quad (10)$$

As in the derivation of the Wiener filter, the quadratic distance between the reconstructed and the real object must then be minimized for each frequency and each color channel:

$$E|[O_c(\omega)]_c - [\tilde{D}(r,\omega)]_r[G_c(r,\omega)]_{r,c}|^2 = min \quad (11)$$

Using equation (9), the following is obtained:

$$E|\{[O_c(\omega)]_c[EH_c(r,\omega)]_{c,r} + [N(r,\omega)]_r\}[G_c(r,\omega)]_{r,c} - [O_c(\omega)]_c|^2 = min \quad (12)$$

By applying the same principles as in the derivation of the Wiener filter, as is known to a person skilled in the art for example from http://en.wikipedia.org/wiki/Wiener_deconvolution, the following is obtained:

$$[O_c(\omega)]_c = [D(r,\omega)]_r \{[EH_c(r,\omega)]_{c,r}*[I]_c[EH_c(r,\omega)]_{c,r} + [\sigma^2]_r\}^{-1}[EH_c(r,\omega)]_{c,r}*[I]_c \quad (13)$$

Here, $[I]_c$ and $[\sigma^2]_r$ are the spectral power densities of the signal for each color channel and the noise:

$$[I]_c = E|[O_c(\omega)]_c|^2; \quad [\sigma^2]_r = E|[N(r,\omega)]_r|^2 \quad (14)$$

If emission spectra of fluorophores overlap, then in each color channel shadows of an object from the other color channel may appear. Such shadow images are distorted with the same detection PSF as the main image in the actual color channel. As a result, an image detected in channel c, $O_c(\omega)$ is a superposition of the images $O_c^{TRUE}(\omega)$ according to the objects assigned to the different color channels:

$$[O_c(\omega)]_c = [M]_c [O_c^{TRUE}(\omega)]_c \tag{15}$$

Here, $[M]_c$ is a demixing matrix. In the case of two colors, for example, the result is:

$$\begin{cases} O_1(\omega) = m_{11} O_1^{TRUE}(\omega) + m_{12} O_2^{TRUE}(\omega) \\ O_2(\omega) = m_{21} O_1^{TRUE}(\omega) + m_{22} O_2^{TRUE}(\omega) \end{cases} \tag{16}$$

It is simple to obtain the true images $O_c^{TRUE}(\omega)$ if the mixing matrix $[M]_c$ thereof is known. If this is not the case, it can be obtained by minimizing a cross correlation between the generated images, i.e. the matrix is to be determined such that the values thereof ensure the lowest cross correlation for the objects which are demixed the best.

If the variant first-mentioned in the general part of the description is used, in which first the high-resolution image is generated and then the corresponding color information is assigned to the locations in the image, the system of equations can be set up and the high-resolution image can be determined exactly as described in EP 2317362 A1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for high-resolution spectrally selective scanning microscopy of a sample, comprising the steps of:
    exciting the sample by illumination radiation to emit fluorescent radiation including
    focusing the illumination radiation into an illumination spot in or on the sample, wherein the illumination spot is diffraction-limited in at least one spatial direction and has a minimum extent in this spatial direction;
    imaging fluorescent radiation coming from the illumination spot in diffraction-limited manner into a diffraction image located in an image plane;
    capturing the diffraction image with a spatial resolution that resolves a structure of the diffraction image;
    displacing the illumination spot relative to the sample into different scanning positions at an increment size of less than half the minimum extent of the illumination spot;
    producing individual images of the structure of the diffraction image for each scanning position by
    imaging the fluorescent radiation into the diffraction image on a detector which has, in the image plane, an entrance surface having a plurality of adjacent location channels, which define the spatial resolution,
    guiding the fluorescent radiation to a spectrometer for exactly one first of the location channels and spectrally evaluating this radiation, and
    guiding the fluorescent radiation in each remaining location channel to an individual detector element which does not perform spectral evaluation and captures the radiation only with respect to the intensity; and
    generating an image of the sample from the individual images, which image has a resolution that is increased over a resolution limit of the optical imaging.

2. The method as claimed in claim 1, wherein the illumination spot has the shape of a point or line.

3. The method as claimed in claim 1, wherein the remaining location channels surround the first location channel in the entrance surface.

4. The method as claimed in claim 3, wherein the first location channel is located centrally in the entrance surface.

5. The method as claimed in claim 1, wherein color data are determined from the spectral evaluation and are assigned to the image of the sample in accordance with the scanning position.

6. The method as claimed in claim 1, wherein color data is determined for each individual image and assigned to the individual images, wherein the colors of the individual images are taken into consideration in the image generation step.

7. The method as claimed in claim 6, wherein a point spread function is utilized in the image generation step and is selected on basis of the colors of the individual images.

8. The method as claimed in claim 1, wherein the first location channel has a greater proportion of the entrance surface than any of the remaining channels.

9. The method as claimed in claim 8, wherein the first channel is formed by a plurality of optical fibers.

10. The method as claimed in claim 1, wherein the first location channel is formed by a hole in the entrance surface through which the fluorescence radiation is guided to the spectrometer, whereas the entrances of the remaining location channels surround the hole and comprise an optical device which separates fluorescent radiation from fluorescent radiation that has fallen through the hole.

11. The method as claimed in claim 1, wherein the detector comprises a fiber bundle, the individual fibers of which start in the entrance surface, wherein one or more of the individual fibers form the first location channel and guide the fluorescent radiation onto the spectrometer, and the remaining fibers are each connected to one of the detector elements.

12. A microscope for high-resolution spectrally selective scanning microscopy, comprising
    a sample space for receiving a sample which is excitable to emit fluorescent radiation,
    an optical unit which comprises a resolution limit and a focal plane, located in the sample space,
    an illumination device, which comprises an entrance for receiving illumination radiation and illuminates, via the optical unit, the sample space with illumination radiation such that the optical unit focuses illumination radiation to a point in the focal plane to form an illumination spot, which is diffraction-limited in at least one spatial direction and has, a minimum extent in this spatial direction,
    an imaging device for diffraction-limited imaging of fluorescent radiation coming from the illumination spot in the focal plane through the optical unit and into a diffraction image on a spatially resolving detector which is located in an image plane that is conjugate to the focal plane,
    wherein the surface detector has a plurality of adjacent location channels which define a spatial resolution at which the structure of the diffraction image of the fluorescent radiation coming from the illumination spot is resolved,
wherein the spatial resolution resolves a structure of the diffraction image,
wherein exactly one first of the location channels guides the fluorescent radiation onto a spectrometer spectral evaluation, and
wherein each remaining location channel guides the fluorescent radiation onto an individual detector element, which does not perform spectral evaluation and captures the fluorescent radiation only with respect to the intensity in the assigned remaining location channel,
a scanning device for displacing the point into different scanning positions at an increment size of less than half the minimum extent of the illumination spot, and
an evaluation device for reading the detector, for evaluating the diffraction structure of the diffraction image from individual image data of the surface detector and from the scanning position is assigned to said individual image data, and for producing an image of the sample that has a resolution that is increased to above the resolution limit.

13. The microscope as claimed in claim 12, wherein the remaining location channels surround the first location channel in the entrance surface.

14. The method as claimed in claim 13, wherein the first location channel is located centrally in the entrance surface.

15. The microscope as claimed in claim 12, wherein the first location channel is formed by a hole in the entrance surface through which the fluorescence radiation is guided to the spectrometer, whereas the remaining location channels surround the hole and comprise an optical device which separates fluorescent radiation from the fluorescent radiation that has fallen through the hole.

16. The microscope as claimed in claim 12, wherein the detector comprises a fiber bundle, the individual fibers of which start in the entrance surface, wherein one or more of the individual fibers form the first location channel and guide the fluorescent radiation to the spectrometer, and the remaining fibers are each connected to one of the detector elements.

* * * * *

UNITED STATES PATENT AND TRADEMARK OFFICE
CERTIFICATE OF CORRECTION

PATENT NO. : 10,649,188 B2
APPLICATION NO. : 15/746325
DATED : May 12, 2020
INVENTOR(S) : Ingo Kleppe et al.

It is certified that error appears in the above-identified patent and that said Letters Patent is hereby corrected as shown below:

In the Specification

Column 11, Line 53:
Now reads: "point the following equation is obtained as the signal D(r,P),"
Should read: -- point the following equation is obtained as the signal D(r,p), --

Column 11, Line 61:
Now reads: "A Fourier transform of D(r,P) with respect to the location"
Should read: -- A Fourier transform of D(r,p) with respect to the location --

Column 12, Line 8:
Now reads: "$EH(r,\omega))\cdot FT_{r'}\{E(r')H(r'+r)\}$"
Should read: -- $EH(r,\omega)=FT_{r'}\{E(r')H(r'+r)\}$ --

Column 12, Line 11:
Now reads: "$D(r,\omega))=O(\omega))EH(r,\omega))$"
Should read: -- $D(r,\omega)=O(\omega)EH(r,\omega)$ --

Column 12, Line 62,63:
Now reads: "$[O_c(\omega)]_c=[D(r,\omega)]_r\{[EH_c(r,\omega)]_{c,r}^*[I]_c[EH_c(r,\omega)]_{c,r}+[\sigma^2]_r\}^{-1}[EH_c(r,\omega)]_{c,r}^*[I]_c$"
Should read: -- $[O_c(\omega)]_c=[D(r,\omega)]_r\{[EH_c(r,\omega)]^*_{c,r}[I]_c[EH_c(r,\omega)]_{c,r}+[\sigma^2]_r\}^{-1}[EH_c(r,\omega)]^*_{c,r}[I]_c$ --

Signed and Sealed this
Fifteenth Day of September, 2020

Andrei Iancu
*Director of the United States Patent and Trademark Office*